F. COBEY.
CHUCK.
APPLICATION FILED MAY 14, 1915.
1,310,409.
Patented July 22, 1919.
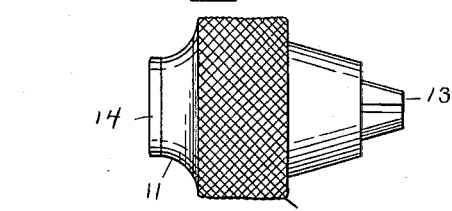
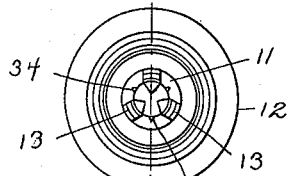
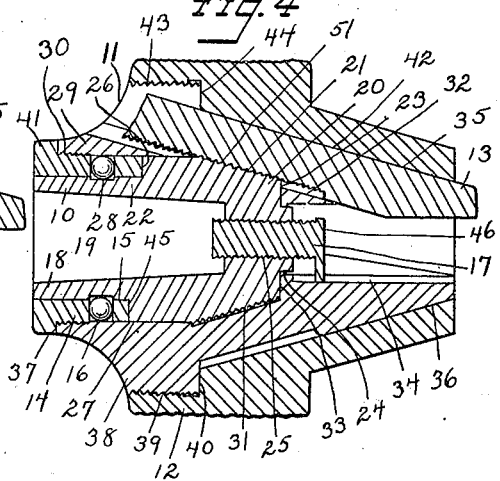
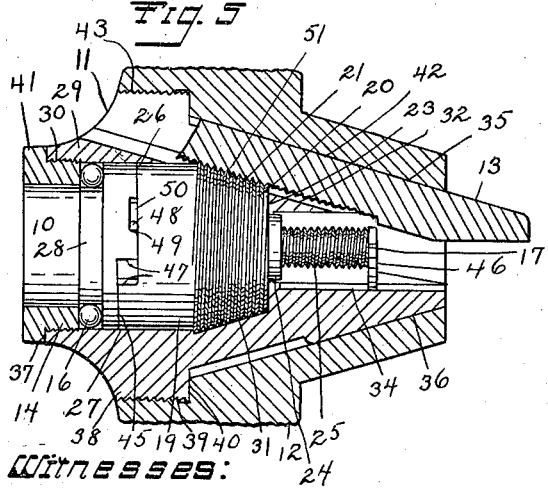
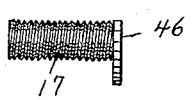
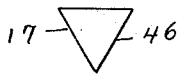
Witnesses:
R. W. Edwards.
H. A. Gangloff.
Inventor:
Frank Cobey.
By Louis M. Schmidt
Atty.

UNITED STATES PATENT OFFICE.

FRANK COBEY, OF EAST BERLIN, CONNECTICUT.

CHUCK.

1,310,409. Specification of Letters Patent. Patented July 22, 1919.

Application filed May 14, 1915. Serial No. 28,170.

*To all whom it may concern:*

Be it known that I, FRANK COBEY, a citizen of the United States, residing at East Berlin, in the county of Hartford and State of Connecticut, have invented certain new and useful Improvements in Chucks, of which the following is a specification.

My invention relates to improvements in chucks, and the object of my improvement is simplicity and economy in construction and convenience and efficiency in use and as pertaining to the feature of the backing or thrust screw shown and to be described, the present application is amplified by the two applications that were filed under date of March 29, 1917, Serial Numbers 158,285 and 158,286.

In the accompanying drawing:—

Figure 1 is a side elevation of my improved chuck.

Fig. 2 is a front elevation of the same.

Fig. 3 is a sectional view on an enlarged scale on the line $x\,x$ of Fig. 2.

Fig. 4 is a similar view of the same with the parts in a different position.

Fig. 5 is a sectional view of the casing, the other parts being in side elevation.

Fig. 6 is a side elevation of the backing screw.

Fig. 7 is a front elevation of the same.

My improved chuck comprises a spindle member 10, a body 11, a shell 12, jaws 13, a sleeve nut 14 having an end bearing surface opposed to an end cam sleeve 15 having a coöperating end surface that is separated from the sleeve nut 14 by a set of balls 16, and a backing screw 17.

The spindle member 10 has a socket 18 of the usual taper form at the inner end for receiving a spindle, and comprises a body 19 at about the middle of the length, having a cylindrical periphery 27, a conical portion 20 extending forwardly from the said cylindrical periphery having a screw thread 21 on the periphery, a reduced cylindrical portion 22 at the inner end, a radial face 23 at the outer end of the tapered or conical screw thread 21 forming an annular shoulder, a short neck 24 extending forwardly from the annular shoulder 23, along the axis, a threaded bore 25 extending through the short neck 24 and inwardly an appreciable distance, and preferably as shown, meeting the tapered socket 18, and having the shoulder 26 formed at the junction of the cylindrical portion 27 of the periphery of the body portion 19 with the reduced rear extension 22 in the form of an end cam, having a screw thread or helical bearing surface.

The extension 22 has a circular recess 28 in the periphery that serves as a track for the balls 16.

The body portion 11 extends over the major portion of the spindle member 10, having a bore comprising the following features:—a cylindrical portion 29 at the rear end and middle portions which fits over the cylindrical periphery 27 of the spindle member 10 and extends an appreciable distance over the extension 22, the extreme inner end of the said cylindrical portion 29 of the bore being screw threaded, as shown at 30; a second conical portion 31 that fits over the conical portion 21; a cylindrical portion 32 that fits over the neck 24; the junction of the portions 31 and 32 constitutes a shoulder 33 that abuts against the shoulder 23; and having the bore 32 extending outwardly or forwardly beyond the neck 24 and the forwardly extending portion being provided with a set of longitudinally extending grooves 34. As shown there are three grooves 34, V-shaped, and spaced angularly at 120 degrees.

The body portion 11 is provided with a set of grooves 35, open on the outer side, for the jaws 13, the same being inclined to correspond to the inclination of the conical surface 21 on the spindle member, and having a depth to correspond to the depth of the jaws 13.

Exteriorly the body portion 11 comprises a conical periphery 36 that is flush with the jaws 13 at the front end portion, an annular radial shoulder 37 at the inner end, and intermediate the ends an enlarged portion 38 having a cylindrical periphery 39 provided with a screw thread adjacent the conical portion 36, there being an annular shoulder 40 at the junction of the said conical portion 36 and the threaded portion 39.

Between the threaded portion 39 and the end shoulder 37 the periphery may be given any finished form desired.

The sleeve 15 fits between the extension 22 and the body portion 11, has a radial face at the rear end that engages with the balls 16, and on the front end has an end cam surface 45 that is the counterpart of the end cam surface 26 on the body portion 11.

The sleeve nut 14 has a body portion that is threaded exteriorly to fit the threaded portion 30 of the bore of the body portion 11 and has a flange 41 at the end that engages with the end shoulder 37, the extreme front end of the body portion of the said nut 14 serving as a bearing surface in engagement with the balls 16.

The shell member 12 has a bore that comprises a conical portion 42 at the front end that fits over the jaws 13 and the opposed conical portion 36 of the body portion 11 and a threaded portion 43 at the rear end that fits the threaded portion 39 of the body portion 11, and has a shoulder 44 at the junction of the said portions 43 and 42 that engages with the shoulder 40.

The backing screw 17 has a screw threaded body portion that is a fit for the thread 25 in the neck 24.

The head 46 of the backing screw 17 is preferably in the form of an equilateral triangle, suitably to provide points at the corners for engaging with the longitudinal grooves 34 in the body portion 11.

The end cam surfaces 26 and 45 as mentioned are helical in form, and comprise one circumferential turn, terminating in each case in a longitudinally directed shoulder 47, the said shoulders coöperating by being brought into abutment to limit the relative movement of the sleeve 15 and the spindle member 10 in one direction.

The relative rotary movement of the sleeve 15 and the spindle member 10 in the counter-clockwise direction is limited by a pin 48 on the spindle member engaging with a shoulder 49 on the sleeve 15. As shown, the said pin 48 extends rearwardly from the face of the end cam surface 26, and the shoulder 49 is formed by cutting a part of the material of the sleeve 15, suitably to form a recess 50 in which the said pin 48 is housed.

The jaws 13 are of appreciable length, fit in the slots 35 in the body portion 11, are formed at the front end suitably to coöperate with the mating jaws to engage a drill or other cylindrical surface, and are provided on the under side with a thread 51 for engaging with the thread 21 on the body portion 11.

The operation is as follows:—

The body portion 11 and the shell member 12 house the operative mechanism generally, the only other laterally exposed part being the lateral edge portion of the flange 41 on the sleeve nut 14 and the protruding portion of the jaws 13 when in extended position.

The spindle member 10 is held longitudinally between the sleeve nut 14 on one side through the medium of the balls 16 and the sleeve 15, and on the other side by the sleeve 12 through the medium of the jaws 13, and is free to have a limited longitudinal movement, responsive to the coöperation of the end cams 45 and 26 during a rotative movement of the spindle member 10 relatively to the sleeve 15.

Such movement operates to effect a quick release of the jaws, and is effected by turning the sleeve 12 relatively to the spindle member 10.

A slow movement of the jaws 13 is effected in either direction by turning the sleeve 12, the spindle member 10 being held fixed, by reason of the engagement of the thread 51 on the jaws with the thread 21 on the spindle member 10.

On turning the sleeve to close the jaws they are moved relatively to the spindle member as mentioned and they are also carried along outwardly bodily with the spindle member by reason of the cam movement, the shoulders 47 being slightly separated and the jaws and spindle member are locked together. On the reverse movement in effecting the quick release referred to, because the jaws, shell member, and body member are locked the initial movement results in a coöperative movement along the cam surfaces, and a bodily separation of the body portion and the shell, thus loosening the hold of the jaws, such movement being sufficient to release the hold on a drill or like hard body held by the jaws.

The backing screw 17 is carried back and forth with the jaws 13, and the head 46 thereof is in line with the opening for the drill between the jaws, so that the said head will limit the amount a drill can be inserted between the jaws.

Because of the to and fro movement of backing screw 17 corresponding to the opening and closing of the jaws the amount the drill can be inserted corresponds to the diameter of the drill.

It is understood that the balls 16 may be omitted and the other minor changes made without departing from the spirit of my invention.

I claim as my invention:—

1. A chuck comprising a spindle member having a cylindrical body portion, a conical outer end portion provided with a screw thread, and a reduced extension at the inner end, a body member having a bore fitting over the said conical portion, and body portion, and extending over the said extension, a shell member, the said shell member and body member having means for operatively housing a set of jaws, a shoulder in the form of an end cam at the junction of the said body portion and extension, an end cam sleeve housed between the said body portion and extension and having an end cam surface coöperative with the said first cam surface, a nut secured to the said body member and filling the end portion of the space between the said body portion and extension.

2. In a chuck, a spindle member having a cylindrical body portion, means for engaging with jaws at the front end, a reduced extension at the rear end, a cam shoulder at the junction of the said body portion and extension, a body member having a cylindrical bore fitting over the said body portion and overhanging the said extension, and having a screw thread at the end portion, a sleeve nut fitting over the said spindle member, having a screw thread engaged with the said first screw thread, and having a bearing surface at the end, and interposed between the said bearing surface and cam shoulder, a set of balls engaged with the said bearing surface and a cam sleeve between the said balls and the said cam shoulder, and having a cam surface opposed to the said cam shoulder.

FRANK COBEY.

Witnesses:
ALFRED L. THOMPSON,
HARRY A. HARGREAVES.

Copies of this patent may be obtained for five cents each, by addressing the "Commissioner of Patents, Washington, D. C."